US010011956B2

(12) United States Patent
Lorieux et al.

(10) Patent No.: US 10,011,956 B2
(45) Date of Patent: Jul. 3, 2018

(54) METHOD AND MOULD FOR WELDING THE ENDS OF TWO RAIL PORTIONS

(71) Applicant: SNCF RESEAU, Paris (FR)

(72) Inventors: Arnaud Lorieux, St Leu la Foret (FR); Claude Monnet, Paray-le-Monial (FR); Serge Detain, Auzouer en Touraine (FR); Rémy Delolmo, La Seyne sur Mer (FR)

(73) Assignee: SNCF RESEAU, Paris (FR)

( * ) Notice: Subject to any disclaimer, the term of this patent is extended or adjusted under 35 U.S.C. 154(b) by 277 days.

(21) Appl. No.: 14/653,833

(22) PCT Filed: Dec. 6, 2013

(86) PCT No.: PCT/IB2013/060702
§ 371 (c)(1),
(2) Date: Jun. 18, 2015

(87) PCT Pub. No.: WO2014/097043
PCT Pub. Date: Jun. 26, 2014

(65) Prior Publication Data
US 2015/0361620 A1    Dec. 17, 2015

(30) Foreign Application Priority Data

Dec. 21, 2012   (FR) .................................... 12 62725

(51) Int. Cl.
*E01B 11/44*       (2006.01)
*B23K 23/00*       (2006.01)
(Continued)

(52) U.S. Cl.
CPC .............. *E01B 11/44* (2013.01); *B22D 19/04* (2013.01); *B23K 20/002* (2013.01); *B23K 23/00* (2013.01);
(Continued)

(58) Field of Classification Search
CPC .......... E01B 11/00; E01B 11/44; E01B 11/48; E01B 11/50; E01B 11/52
See application file for complete search history.

(56) References Cited

U.S. PATENT DOCUMENTS

| 4,716,836 A * | 1/1988 | Hardt ...................... E01B 29/46 104/15 |
| 5,419,484 A * | 5/1995 | Radulescu ............. B23K 23/00 104/15 |
| 2008/0230520 A1* | 9/2008 | Lichtberger ............ E01B 29/46 219/53 |

FOREIGN PATENT DOCUMENTS

WO    WO 2012/049282    4/2012

OTHER PUBLICATIONS

International Search Report dated May 22, 2014 from corresponding WO Application No. PCT/IB2013/060702 from International Searching Authority (EPO) (2 pages).

* cited by examiner

*Primary Examiner* — Robert J McCarry, Jr.
(74) *Attorney, Agent, or Firm* — Klein, O'Neill & Singh, LLP

(57) ABSTRACT

Method for the aluminothermic welding of rails, involving the steps of: —triggering an aluminothermic reaction in a crucible, —pouring the metal resulting from said reaction into the mold so as to fill the molding cavity from the rail flange, —after filling the cavity, triggering a second aluminothermic reaction above the rail head, and pouring the metal resulting from said reaction into the cavity in the region of the rail head. The mold used in the method is designed to fit over the ends of two rails to form a molding cavity comprising a crucible positioned above the rail head region so that it can be fed with molten metal of the cavity via a secondary passage.

11 Claims, 4 Drawing Sheets

(51) Int. Cl.
*E01B 11/52* (2006.01)
*E01B 26/00* (2006.01)
*E01B 29/44* (2006.01)
*B22D 19/04* (2006.01)
*B23K 20/00* (2006.01)
*B23K 31/02* (2006.01)
*E01B 11/46* (2006.01)
*B23K 101/26* (2006.01)

(52) U.S. Cl.
CPC .............. *B23K 31/02* (2013.01); *E01B 11/46* (2013.01); *E01B 11/52* (2013.01); *E01B 26/00* (2013.01); *E01B 29/44* (2013.01); *B23K 2201/26* (2013.01); *Y10T 29/49991* (2015.01)

METHOD AND MOULD FOR WELDING THE ENDS OF TWO RAIL PORTIONS

INVENTION FIELD

The invention involves the field of railway maintenance and more particularly welding the ends of two longitudinal rail sections placed end-to-end.

The invention concerns a process and a mold for welding the ends of two longitudinal rail sections, in particular railway tracks, placed end-to-end, as well as an assembly formed by two rail sections and a weld.

PRIOR ART

In railway maintenance, aluminothermic process welding the ends of two longitudinal metal rail sections placed end-to-end on the track is known. To do so, the ends of the two rail sections are first placed facing each other establishing a joining (or dividing) space between them. A mold is then placed around this space, so established, and the ends of the rail sections, so placed, and then liquid metal is poured into the mold so as to fill the welding space between the two rail sections. Finally, the weld is obtained by the metal solidifying as it cools. FIGS. 1 and 2 illustrate an assembly 1 formed by two rail sections 2 joined by a weld 3.

However, during solidification, tension forces in the metal pull the weld down; the weld thereby in turn pulling the two rail sections down. Such sagging of the assembly formed by the two rail sections and the weld may create geometry issues which can be identified subsequently by a monitoring operator and require servicing. In certain cases, such geometry issues cannot be detected by a monitoring operator and therefore present a danger for a vehicle moving along the rails.

An existing solution consists of lifting the two rail sections, for example by at least 1 mm for 1 m of rail length, so as to position them in a cone or point before installing the welding mold. Such positioning prevents, by compensation, the tension forces in the metal from creating sagging in the assembly formed by the rail ends and the weld when the weld sags.

Such lifting nevertheless requires specific tooling requiring time to install and therefore presenting a disadvantage. Moreover, such lifting is performed differently from one maintenance operation to another, for example when the maintenance operator is not the same or when the tooling is not positioned in the exact same way or when the type of rail or crosstie is different. In such case, the final geometric placement of the weld and rail sections is different from one weld to another, presenting a disadvantage. Moreover, when the rail sections are lifted too high, the cone formed by the rail sections assumes the form of a springboard which may lift a vehicle moving along the rails, in particular at high speed, which, on the one hand, may impact the track's geometry and, on the other hand, may become dangerous when trains moving along the track, in particular at high speed, cause damage to the rails, also therefore presenting a disadvantage.

Moreover, in order to eliminate the part of the weld above the rail sections, a first weld and rail section milling step, called gross finishing, is required to rough out the weld before full cooling so as to make the assembly sufficiently flat to allow vehicles to pass on the rails.

However, as the tension forces in the metal pull the weld and the rail sections downwards during solidification, full cooling of the weld must be achieved and a vehicle must run over the rails to flatten the rails portions put in a cone position before proceeding with a second milling step, called finishing, in order to obtain the flatness required for using the road. An operator is therefore required to return subsequently, generally the next day, in order to perform the finishing, presenting another disadvantage.

Lastly, lifting the rail sections too high may require excessive milling on the rail sections which may lead to altering the rails' geometry beyond the tolerances required for vehicles moving along the rails, for example, 0.2 mm height gap over 1 m of rail for a high speed train, also presenting a disadvantage.

INVENTION DISCUSSION

The invention aims to improve the existing welding processes for two longitudinal rail section ends in particular so as to simplify railway track rail maintenance and reduce the time and cost of such operations.

Moreover, although the invention has been established in the field of railway rail section maintenance or renewal, it may also be applied in any rail section maintenance or renewal in which welding is performed by aluminothermic process or any other similar process.

Therefore, the invention scope is a process for welding two longitudinal rail sections, in particular railway tracks, including:
- a step of placing the two longitudinal rail sections to be welded end-to-end so as to create a joining space between their two ends,
- a step of installing a welding mold around said joining space, said mold defining a welding volume between the two rail sections,
- a step of pouring liquid welding metal into said welding volume such that the liquid metal mass poured is greater in the lower half of the welding volume than in the upper half,
- a solidification step of the poured metal so as to weld the two rail sections.

The term "end-to-end" shall be understood as one end of the first rail section being placed facing the end of the second rail section creating a space between the two, i.e. without the two ends touching.

"Lower half" shall be understood as the portion of the volume located below the horizontal plane crossing the volume approximately at half its height. "Upper half" shall be understood as the portion of the volume located above the horizontal plane crossing the volume approximately at half its height.

The metal mass is thereby distributed progressively, during the pouring step, so as to obtain a greater metal mass in the lower mold portion than in the upper mold portion.

Thereby, given that the tension forces in the metal are greater in the lower mold portion, where the metal volume is greater than in the upper portion, the poured metal retracts generally towards said upper portion, causing the weld to lift as it cools.

The rail sections may therefore be placed end-to-end in line with each other without requiring lifting, providing a reduction of the maintenance time and cost and improving operation repeatability.

Moreover, not lifting the rail sections prevents from creating a springboard effect on the track whose safety is therefore increased.

Moreover, as it is no longer necessary to lift the rail section, there is no lifting discrepancy from one maintenance operation to another, providing for obtaining welds with consistent geometric quality.

In order to refine rail sections ends placement facing each other, the rail sections placement step may be advantageously achieved using an alignment system.

Preferably, the weld is performed by aluminothermic process.

According to one invention aspect, the process includes a step of warming the welding mold and the ends of the two rail sections so as to facilitate and improve the welding of the two rail sections.

Advantageously, the process includes a step installing a crucible in which the metal to be poured is placed.

According to one invention aspect, the process includes, subsequent to the pouring step, a step of removing the mold from the weld.

Preferably, the process includes, subsequent to the pouring step, a milling step limited to the weld, more particularly limited to the part of the weld extending above the rail portions after the weld metal is lifted between the two rail sections when it solidifies.

In this manner, with the process according to the invention, only the weld is milled and it is no longer necessary to also mill the rail sections, which prevents from altering the rail geometry on the surface and allows to perform the milling step quickly.

Moreover, waiting for full weld cooling before the finishing step is no longer required because there is no longer any risk of weld sagging. Milling can be performed in a single step, thereby avoiding having an operator return at a later time, avoiding wasting time and thereby reducing costs.

According to one invention characteristic, the welding material is metallic, such as steel.

The invention also concerns a welding mold for the two longitudinal rail sections, in particular railway tracks, configured to be placed on said rail sections and defining a weld volume configured, on the one hand, to receive the liquid welding metal and, on the other hand, such that the space defined by the weld volume in its lower half is greater than the space defined by the welding volume in its upper half.

The welding volume is thereby configured such that the mass of the liquid metal poured into said welding volume is greater in the lower half of the welding volume than in the upper half.

Advantageously, the welding volume is at least partly flared, i.e. widened, at least flared in its lower half, compared to its upper half, so as to receive a greater liquid welding metal mass than that received by the upper half, "Flared" shall be understood here as the volume width increasing from the top down.

Also advantageously, the volume flaring increase, from the top down, is progressive, preferably in a direction both parallel and/or perpendicular to the rail sections' longitudinal axis. "Progressive" shall be understood as the volume flaring increase does not vary abruptly. The volume's external contour may be, for example, at least partly concave.

According to an invention characteristic, the lower half of the welding volume includes at least one roughly tronconical section portion.

Preferably, said portion is a truncated pyramid.

According to another invention characteristic, the welding mold is made of refractory sand.

The invention also concerns an assembly formed by two longitudinal rail sections placed consecutively and a weld, part of which is placed between the two rail sections, such that the weld width is larger at its base than at its median portion. "Weld width" shall be understood as the weld dimension along the rails' longitudinal axis.

Preferably, the weld includes a bead. Said bead is created by the larger mass of liquid metal poured in the lower half of the weld volume and allows to direct the blow holes into the vents, i.e. into the mold channels, when the metal solidifies. This bead is one of the elements that guarantees the weld's internal health.

Advantageously, the bead extends over the majority of the upper portion of the weld.

The bead is advantageously flared in its lower portion.

Preferentially, the bead includes at least one truncated pyramid portion.

The dimensions of the smaller base of said truncated pyramid are advantageously included between 45 mm and 55 mm and the larger base dimensions are between 65 mm and 75 mm.

Other invention characteristics and advantages are revealed in the following description of the appended figures provided as non-limiting examples and in which identical references have been attributed to similar objects:

Figure 6:
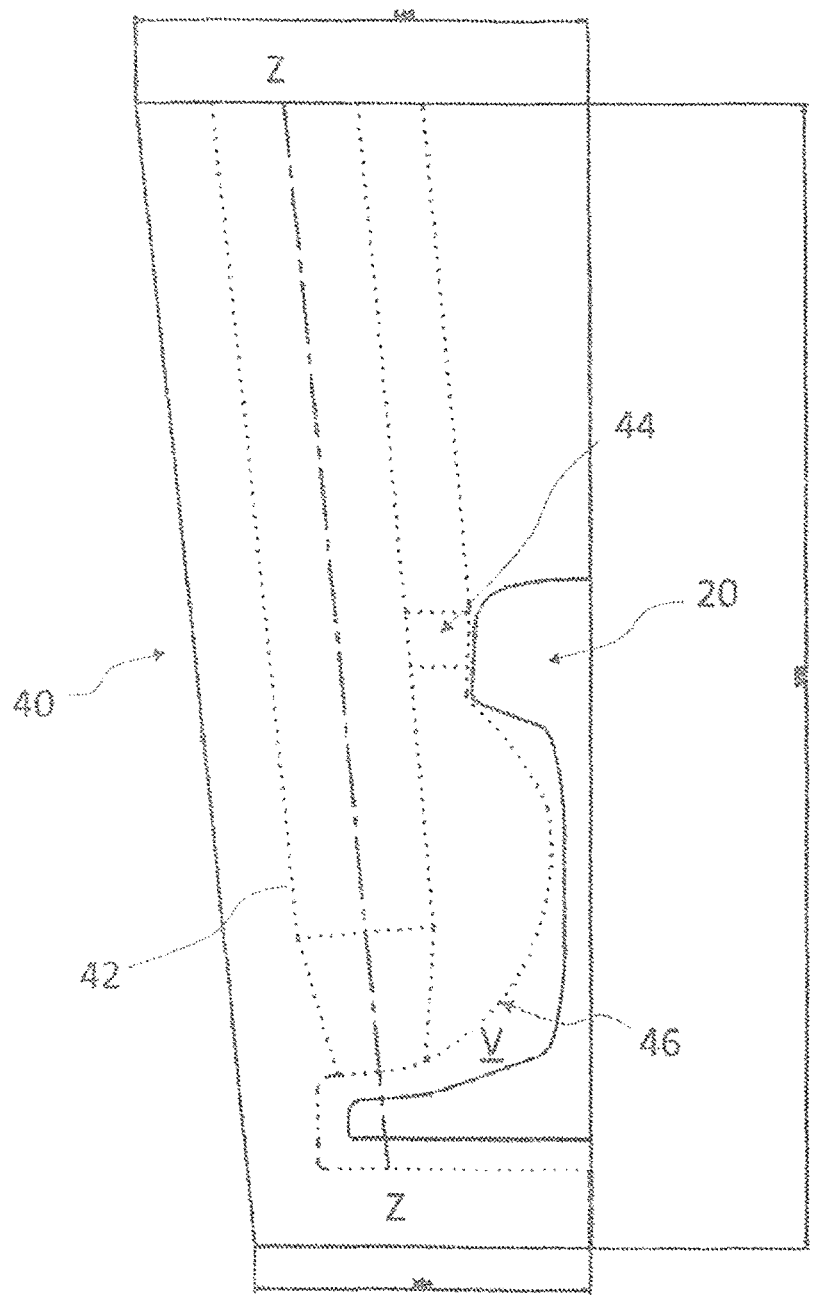

FIG. 6 partially illustrates the profile of one embodiment of the weld mold according to the invention.

DETAILED DESCRIPTION

Weld System and Mold According to the Invention

Building and maintaining railway tracks requires welding rail sections together at their ends.

Figure 1:
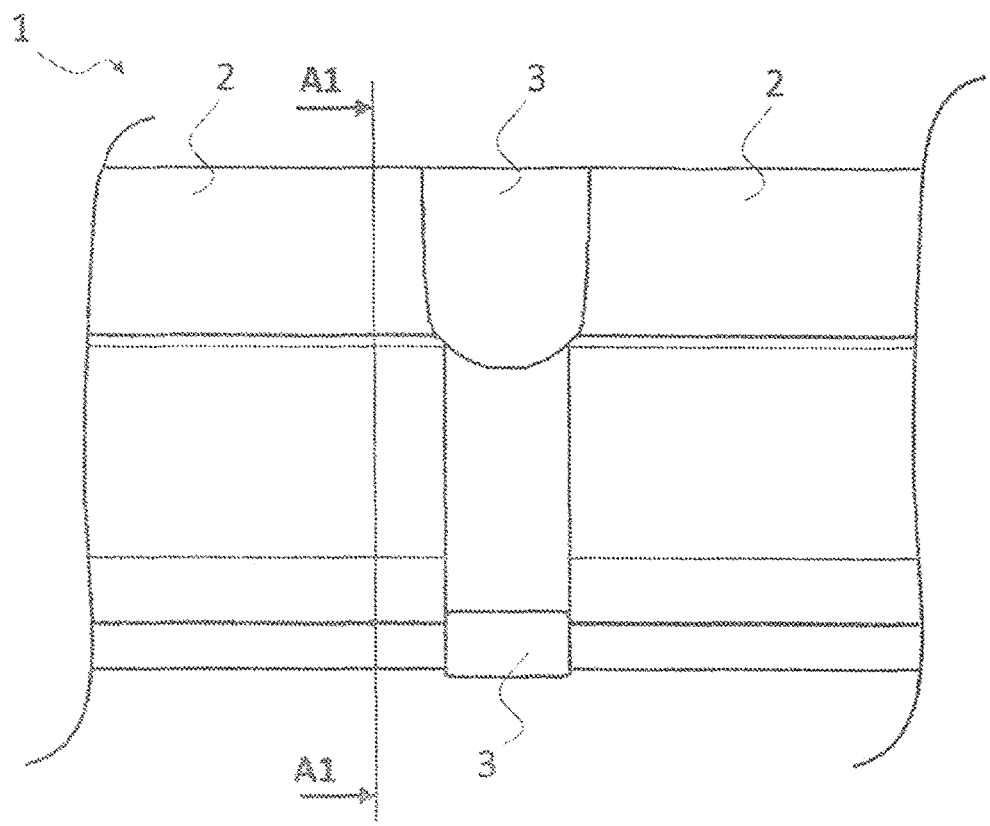
FIG. 1 is a partial profile view of an assembly formed by two rail sections joined by a weld according to prior art.
Figure 2:
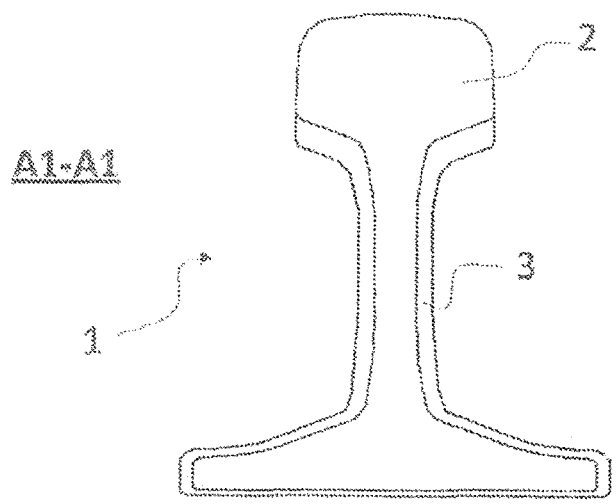
FIG. 2 is a view of the A1-A1 cross-section of the assembly in FIG. 1.
Figure 3:
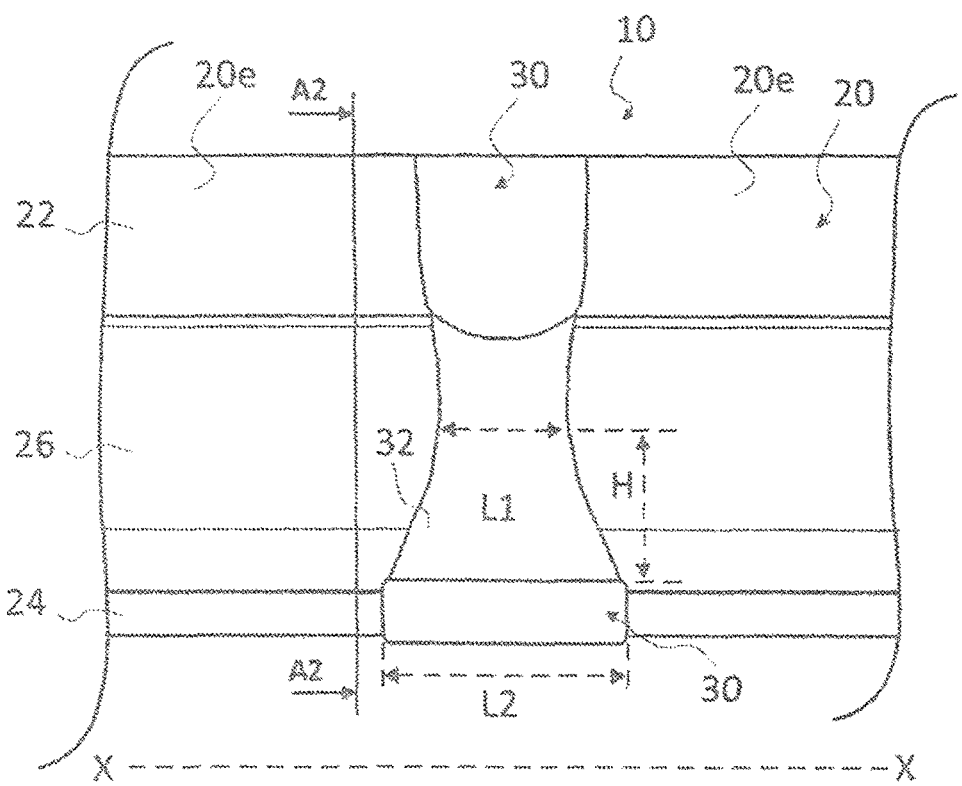
FIG. 3 is a partial profile view of an assembly formed by two rail sections joined by a weld according to the invention.
Figure 4:
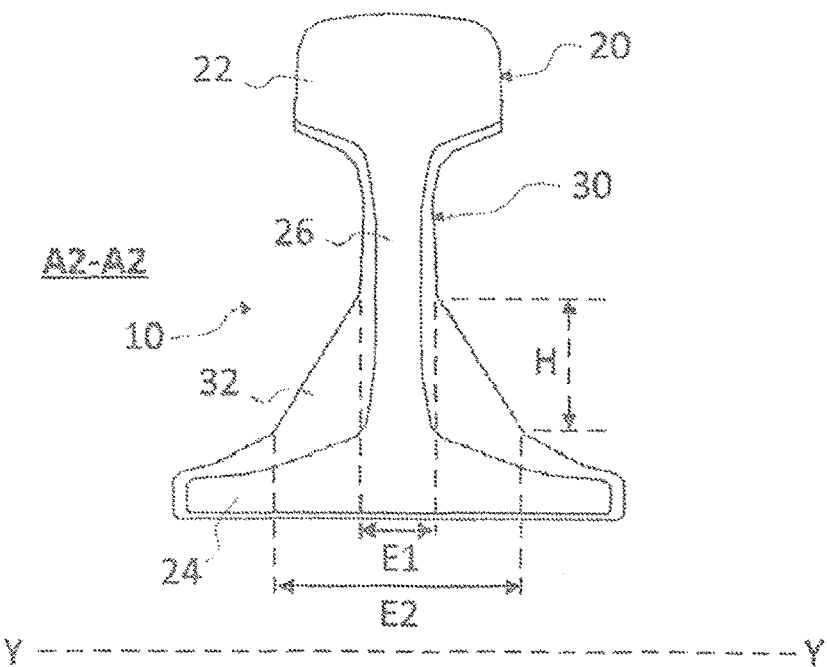
FIG. 4 is a view of the A2-A2 cross-section of the assembly in FIG. 3.
Figure 5:
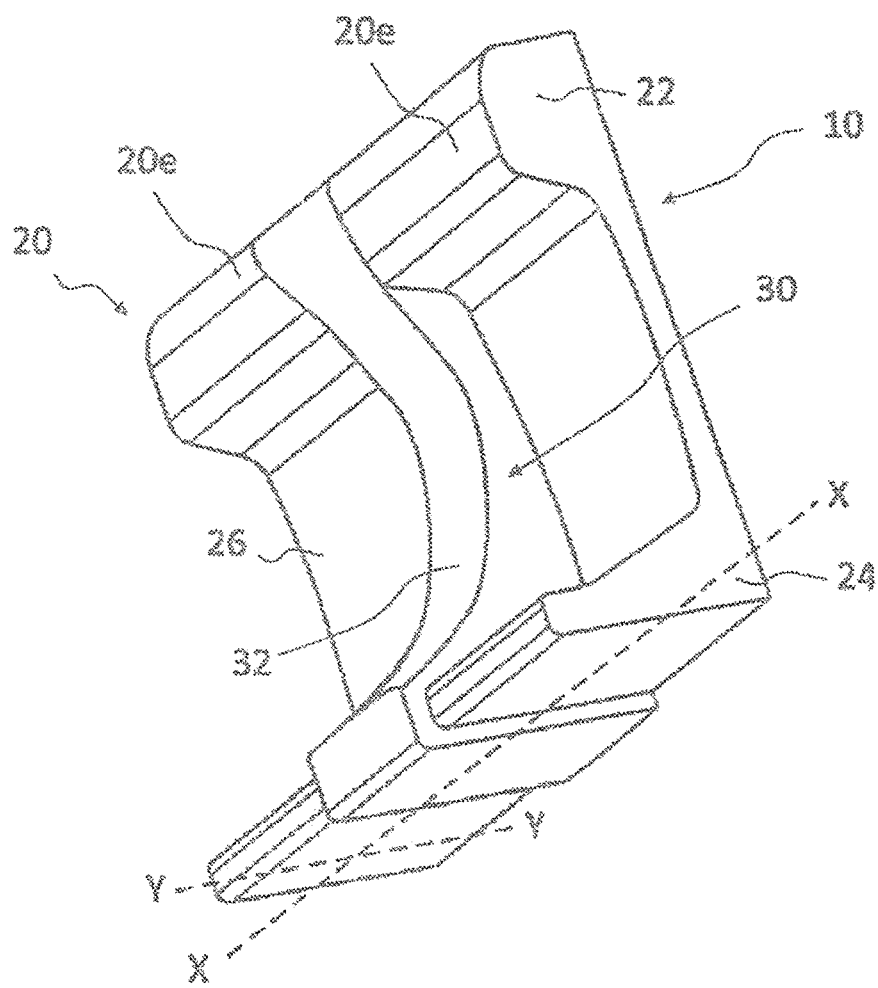
FIG. 5 is a perspective view of the assembly in FIG. 3.

FIGS. 3 to 5 are partial representations of assembly 10 formed by two rail sections 20 joined by a weld 30 at their ends 20e.

Each rail section 20 includes an upper, mushroom-shaped part 22 and a base 24 extending along axis YY perpendicular to longitudinal axis XX of the rail sections 20. The upper part 22 and the base 24 are connected by a less thick surface 26.

As illustrated by FIG. 3, weld 30 includes a bead 32 in the form of a truncated pyramid.

Length L1 of the smaller base (or upper base) of truncated pyramid 32 extending along longitudinal axis XX of the rail sections is comprised between 45 mm and 55 mm, preferably approximately equal to 50 mm.

Length L2 of the larger base (or lower base) of truncated pyramid 32 extending along longitudinal axis XX of the rail sections is comprised between 65 mm and 75 mm, preferably approximately equal to 70 mm.

Length E1 represents the length of the smaller base of truncated pyramid 32 extending along axis YY perpendicular to axis XX.

Length E2 represents the length of the larger base of truncated pyramid 32 extending along axis YY perpendicular to axis XX.

Weld 32 joining assembly 10 is obtained by pouring liquid metal into a mold as described hereinafter.

FIG. 6 illustrates welding mold 40 according to the invention placed around two rail sections 20 before pouring the welding metal in mold 40.

Welding mold 40 includes a vent 42 extending roughly vertically along direction ZZ so as to allow the pouring of the welding metal by gravity up to the welding volume V defining the weld contours between the two rail sections 20.

Passage 44 also allows the pouring of the welding metal at the level of the mushroom 22 of the rail sections 20 so as to completely fill welding volume V.

Lastly, welding mold 40 includes curved contour 46 allowing the flare of the welding volume in its lower half so as to receive a greater quantity of welding metal and thereby to allow said metal not to sag rail sections 20 when it cools.

Invention Implementation

In order to weld the two longitudinal rail sections 20, the two rail sections 20 to be welded are placed end-to-end so as to create a joining space (not represented) between their ends 20e.

An alignment bench can be used to place the two ends 20e of the rails sections 20 facing each other. The alignment consists in placing rail sections or end pieces 20 end-to-end such that the surfaces of the upper part 22 of rail sections 20 fall into the same roughly horizontal plane and that their lateral surfaces are oriented towards the interior of the track in a roughly vertical plane, both planes being perpendicular to each other.

Welding mold 40 defining welding volume V between the two rail sections is then installed around said joining space.

A system for pre-heating the welding mold and the ends 20e of the two rail sections 20 is then installed so as to facilitate and improve the welding of the two rail sections 20. Preheating may be by forced air, oxygen-propane, air-gas or any other known type of pre-heating in order to allow such welding.

A crucible, containing an aluminothermic charge including the metal to be poured, is placed above the weld.

The charge is lit so that the aluminothermic reaction occurs and the liquid welding metal flows from the crucible by gravity into the welding volume.

Once poured, the liquid metal mass is then, according to the invention, greater in the lower half of the welding volume than in its upper half.

The mold is then removed in order to allow the poured metal to cool and solidify so as to form the weld joining the two rail sections.

The form conferred to the weld by the mold according to the invention allows, by tension forces in the metal, the weld lifting.

The weld portion extending above the rail portion can therefore be milled before complete weld cooling.

The invention claimed is:

1. A process for welding two longitudinal rail sections including:
    a step of placing the two longitudinal rail sections to be welded end-to-end so as to create a joining space between the ends of the two longitudinal rail sections;
    a step of installing a welding mold around said joining space, said mold defining a welding volume between the two longitudinal rail sections, wherein the welding volume has flaring in a lower half of the welding volume, the flaring increase, towards a bottom surface of the welding volume from a medial portion of the welding volume, is progressive, in a direction both parallel and perpendicular to a longitudinal axis of at least one of the two longitudinal rail sections such that a weld width is larger at a base than at the median portion of the welding volume;
    a step of pouring liquid welding metal into said welding volume such that the liquid metal mass poured is greater in the lower half of the welding volume than in a upper half;
    a solidification step of the poured metal so as to weld the two longitudinal rail sections.

2. The process according to claim 1, including, subsequent to the pouring step, a milling step limited to the part of the weld extending above the rail portions after the lifting of the assembly comprising the two rail sections and the weld.

3. The process according to claim 1, including a single milling step.

4. A welding mold for two longitudinal rail sections configured to be placed on said rail sections and defining a welding volume configured to receive a liquid welding metal and such that a space defined by the welding volume has a lower half that is greater than the space defined by the welding volume in an upper half, wherein the welding volume has flaring in the lower half, the flaring increase, towards a bottom surface of the welding volume from a medial portion of the welding volume, is progressive, in a direction both parallel and perpendicular to a longitudinal axis of at least one of the two longitudinal rail sections such that a weld width is larger at a base than at the median portion of the welding volume.

5. The mold according to claim 4, wherein the welding volume is has the flaring in at least the lower half of the welding volume so as to receive a greater liquid welding metal mass than that received by the upper half.

6. The mold according to claim 5, wherein the welding volume has the flaring progressively from the top down.

7. The mold according to claim 5, wherein the lower half of the welding volume includes at least one roughly tronconical section portion.

8. The mold according to claim 7, wherein said portion is a truncated pyramid.

9. An assembly formed by two longitudinal rail sections placed consecutively and a weld obtained by the process according to claim 1, part of which is placed between the two rail sections.

10. The assembly according to claim 9, wherein the weld includes a bead flared in lower portion of the weld.

11. The assembly according to claim 10, wherein the bead includes at least one truncated pyramid portion.

* * * * *